United States Patent [19]

Pees

[11] Patent Number: 4,961,594
[45] Date of Patent: Oct. 9, 1990

[54] END RETAINER FOR AIR SPRING IN STRUT SUSPENSION

[75] Inventor: James M. Pees, Centerville, Ohio

[73] Assignee: General Motors Corporation, Detroit, Mich.

[21] Appl. No.: 342,147

[22] Filed: Apr. 24, 1989

[51] Int. Cl.$^5$ ............................................. B60G 15/14
[52] U.S. Cl. .................................... 280/693; 280/672; 267/64.24
[58] Field of Search ............... 280/693, 702, 708, 713, 280/688, 690, 691, 711, 663, 672; 267/64.21, 64.24

[56] References Cited

U.S. PATENT DOCUMENTS

| | | | |
|---|---|---|---|
| 3,573,880 | 4/1971 | Sakai | 280/96.2 |
| 4,688,774 | 8/1987 | Warmuth, II | 267/64.21 |
| 4,778,198 | 10/1988 | Gold | 280/702 |
| 4,779,893 | 10/1988 | Juechter | 280/668 |

FOREIGN PATENT DOCUMENTS 2063448 12/1970 Fed. Rep. of Germany .

OTHER PUBLICATIONS

Goodyear Tire & Rubber, Industrial Engineering Manual, p. 21.

Primary Examiner—Charles A. Marmor
Assistant Examiner—Karin Tyson
Attorney, Agent, or Firm—Saul Schwartz

[57] ABSTRACT

A top end retainer for an air spring sleeve in an automotive strut suspension system includes an elliptic clamping flange having a perimeter equal to the circumference of the top end of the air spring sleeve so that the sleeve fits over the clamping flange without stretching. A bushing aperture in a center web attached to the clamping sleeve is offset to an end of the flange. A piston rod of the strut is received in the bushing aperture through an elastomeric bushing and the center web is connected to the sprung mass for rotation so that the strut and air spring are rotatable about a steering axis. The geometric center of the elliptic flange is further offset from the longitudinal axis of the strut than would be the case with a circular flange having a diameter equal to the diameter of the top end of the air spring sleeve so that the top end retainer according to this invention contributes to optimization of the inclination of the line along which the air spring resultant force is directed.

2 Claims, 2 Drawing Sheets

END RETAINER FOR AIR SPRING IN STRUT SUSPENSION

FIELD OF THE INVENTION

This invention relates to automotive air spring strut suspension systems having side load compensation.

BACKGROUND OF THE INVENTION

Typical automotive strut suspension systems include a damper tube connected to the unsprung mass of the vehicle, a piston rod slidable on the damper tube and connected to the sprung mass of the vehicle, and a spring around the strut reacting against a seat on the damper tube and against a seat on the sprung mass. The spring may be a coil spring or an air spring of the type having a reinforced flexible sleeve sealed at the bottom on an air spring piston on the damper tube and at the top on an end retainer on the sprung mass. To minimize side loads on the rod and on the piston, the springs in some strut suspension systems are tilted relative to the struts so that the spring resultant forces more closely approach a theoretical optimum inclination. An air spring end retainer according to this invention contributes to optimization of the angle of inclination of an air spring in a strut suspension system.

SUMMARY OF THE INVENTION

This invention is a new and improved end retainer for an air spring in an automotive strut suspension system, the air spring being of the type having a reinforced flexible sleeve with a circular top end adjacent the end retainer. The end retainer according to this invention includes an elliptic clamping flange having a perimeter length equal to the perimeter length or circumference of the top end of the air spring sleeve so that the sleeve fits over the flange without stretching. The end retainer further includes a center web rigidly connected to the elliptic flange and a bushing aperture in the center web tangent to the elliptic clamping flange at a major dimension end of the flange. The end retainer according to this invention is supported on the sprung mass of the vehicle at a angle relative to the longitudinal axis of the strut and with the piston rod of the strut in the bushing aperture. An elastomeric bushing is captured in the bushing aperture of the web of the end retainer and is connected to the piston rod of the strut whereby the piston rod is connected to the sprung mass of the vehicle. The geometric center of the elliptic clamping flange cooperates with the geometric center of the rolling lobe at the other end of the air spring sleeve in defining the line of action of the air spring resultant force.

DESCRIPTION OF PREFERRED EMBODIMENT

Figure 1:
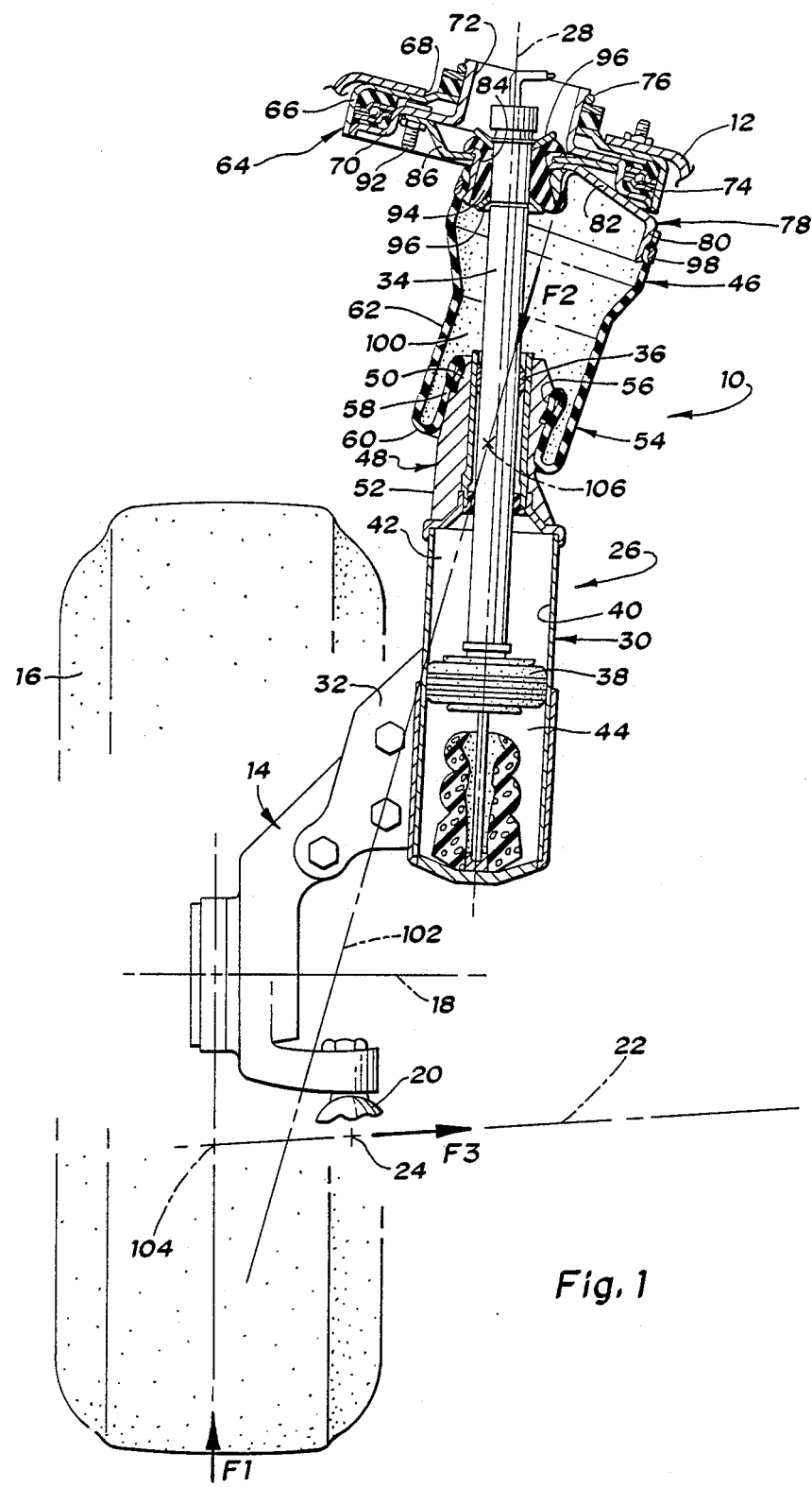
FIG. 1 is a partially broken away elevational view of an automotive air spring strut suspension system having an air spring end retainer according to this invention.

Referring to FIG. 1, a strut suspension system 10 is disposed between a fragmentarily illustrated sprung mass 12 of an automobile and an unsprung mass represented by a wheel support 14 and a wheel 16 mounted thereon for rotation about an axis 18 of the support. A ball stud 20 on the wheel support defines part of an articulated joint between the support and a lateral control arm, not shown, of the vehicle aligned on a transverse axis 22 thereof. The center of the articulated joint is represented by a point 24, FIG. 1, located at the intersection of the axis 22 and the center of the spherical bearing end of the ball stud 20.

The wheel support 14 is also connected to the sprung mass 12 of the vehicle by a strut 26 having a longitudinal axis 28. The strut includes a cylindrical damper tube 30 bolted to the wheel support through a lug 32, a rod 34 slidable along the strut axis 28 in a rod guide 36 on the damper tube, and a piston 38 on the rod slidable along the strut axis 28 on an inside wall 40 of the damper tube 30. The piston divides the inside of the damper tube into an upper working chamber 42 and a lower working chamber 44 which are preferably gas filled but which may be liquid filled. The piston 38 carries valving, not shown, for controlling fluid flow across the piston. An air spring 46 is disposed around the strut 26 between the damper tube 30 and the sprung mass 12.

The air spring 46 includes an air spring piston 48 rigidly attached to the damper tube 30 around the rod guide 36. The air spring piston has a clamping diameter 50 above an irregularly shaped outside surface 52. A cord reinforced, flexible sleeve 54 of the air spring has a circular lower end 56 sealingly clamped against the clamping diameter 50 of the piston. The sleeve 54 folds outward from the clamping diameter to define an inside wall 58 of the air spring which lays against the outside surface 52 of the piston. The sleeve 54 folds outward at a rolling lobe or meniscus 60 and defines an outer cylindrical wall 62 around the rod 34 which outer wall includes a small diameter part at the bottom adjacent the rolling lobe and a big diameter part at the top of the outer wall.

Figure 2:
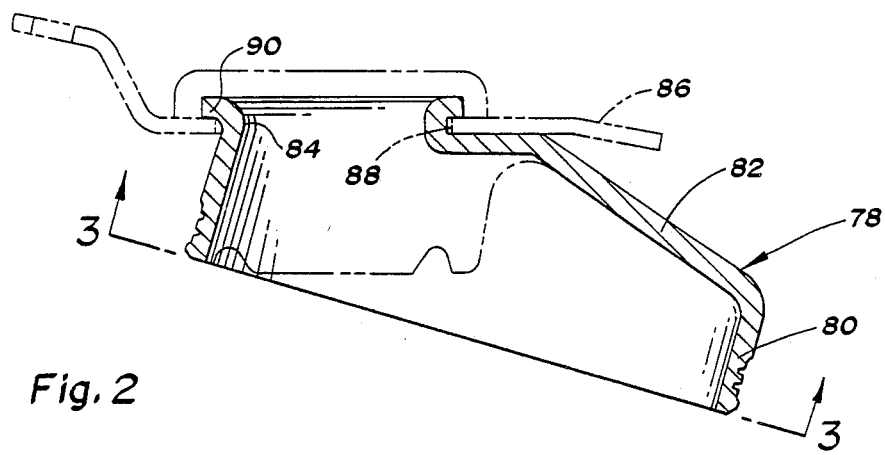
FIG. 2 is an enlarged view of a portion of FIG. 1 showing the air spring end retainer according to this invention.
Figure 3:
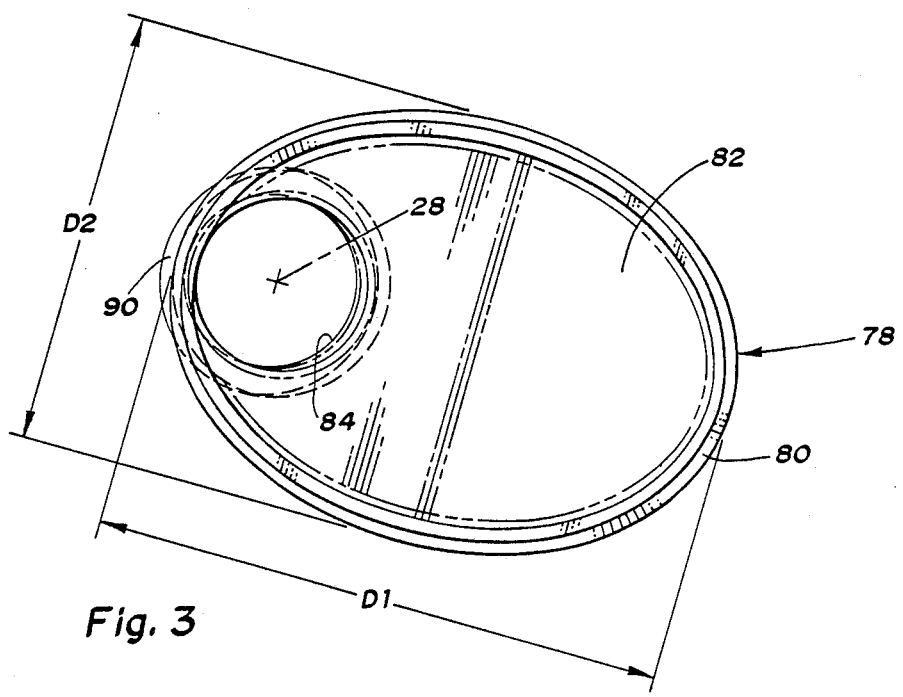
FIG. 3 is a view taken generally along the plane indicated by lines 3—3 in FIG. 2.

Referring to FIGS. 1-3, an upper bearing assembly 64 between the sprung mass 12 and the strut 26 and the air spring 46 includes an annular upper support 66 bolted to the sprung mass 12 around an aperture or hole 68 therein and an annular lower support 70 below the upper support. The lower support has a tubular extension 72 projecting into the aperture 68 in the sprung mass. A bearing 74 is disposed between the upper and lower supports 66 and 70 so that the two are relatively rotatable. The lower support 70 is retained on the sprung mass 12 by a ring 76 around the tubular extension of the lower support. The lower support 70 is connected to the air spring 46 and to the rod 34 of the strut by an end retainer 78 according to this invention.

The end retainer 78 resembles an inverted cup and includes a clamping sleeve or flange 80 and an integral center web 82. When viewed perpendicular to the plane of the flange 80, FIG. 3, the clamping flange is elliptic and has a major dimension D1 and a minor dimension D2. The center web is slightly conical, FIG. 2, and has a circular bushing aperture 84 therein at a major dimension end of the elliptic flange. The edge of the aperture 84 is substantially tangent to or just touches the elliptic clamping flange 80, FIG. 3.

The end retainer 78 is attached to the lower support 70 through a filler plate 86, FIGS. 1 and 2. The filler plate 86 as a hole 88 therein through which a flange 90 around the bushing hole 84 in the end retainer 78 protrudes. The protruding flange 90 is spun over and welded to the filler plate so that the end retainer is rigidly attached to the filler plate. The filler plate is attached to the lower support 70 by a plurality of screws, only a single screw 92 being shown in FIG. 1, so that the end retainer 78 is rotatable relative to the sprung mass 12 of the vehicle.

An elastomeric bushing 94 is fixed in the bushing aperture 84 by conventional means and has a center bore therethrough which receives the top end of the rod 34. A pair of retainers 96 on the rod above and below the bushing 94 prevent vertical sliding movement of the rod relative to the bushing and, hence, relative to the sprung mass 12. The strut 26 and wheel 16 are steerable relative to the sprung mass 12 about a steering axis, not shown, which extends through the point 24 at the spherical center of the ball stud 20 and through the center of the bearing 74.

Because of the non-stretchable nature of the cord reinforced flexible sleeve 54 of the air spring in its fully inflated condition, the perimeter of the clamping flange 80 is calculated to equal the perimeter or circumference of the circular top end of the outer wall 62 of the inflated air spring sleeve so that the latter fits snugly over the clamping flange without being stretched beyond its limit. Once fit over the clamping flange, the outer wall 62 is sealingly held thereagainst by a clamp 98 so that a sealed gas chamber 100 is defined within the air spring 46.

As seen best in FIG. 1, a resultant road force on the wheel 16 is represented by a force arrow F1 acting vertically on the wheel. That force is partially balanced by an air spring resultant force represented by a force arrow F2 which acts along a theoretical resultant force line 102 of the spring. For static equilibrium, the road force is also partially balanced by a third force represented by a force arrow F3 acting on the wheel support 14 through the point 24 at the spherical center of the ball stud 20 and directed along the transverse axis 22.

With respect to side loading on the rod 34 and on the piston 38, an optimum condition obtains when the resultant force line 102 intersects the transverse axis 22 in the plane of the wheel 16 containing the force arrow F1, as at a theoretical point 104. In that condition, there is no side loading on the rod 34 or the piston 38 because the forces represented by force arrows F1, F2 and F3 all act through the theoretical point 104. If the resultant force line 102 passes laterally inboard of the theoretical point 104, side loads develop at the rod guide 36 and at the piston 38 on the inside wall 40 of the damper tube, the magnitudes of which increase as the distance inboard from the theoretical point 104 increases. Accordingly, optimum inclination or tilt of the air spring 46 is characterized by intersection of the resultant force line 102 and the theoretical point 104.

The inclination of the resultant force line 102 of the air spring 46, which in the illustrated embodiment is not the optimum inclination as defined above, is determined by the locations of the geometric centers of the end retainer 78 and the rolling lobe 60. As a practical matter, the geometric center of the rolling lobe 60 cannot be moved very far outboard of the longitudinal axis 28 of the strut. For example, a point 106, FIG. 1, within the confines of the rod 34 represents the geometric center of the rolling lobe 60 under static, design load conditions. Instead, the more practical approach has been to move the location of the geometric center of the upper retainer 78 laterally outboard or to the right, FIG. 1, to achieve incremental increases in the inclination of the resultant force line toward the optimum inclination as defined above.

The end retainer 78 according to this invention represents an implementation of the aforesaid more practical approach. Referring to FIG. 3, the improvement afforded by the end retainer 78 is described by the following example. The perimeter of the elliptic flange 80 on the end retainer 78 is relatively closely approximated by the following equation:

$$P = 3.1416 \sqrt{2(a^2 + b^2)}$$

where P is the perimeter, a is one half the long dimension D1 of the flange and b is one half the short dimension D2 of the flange. If the elliptic flange 80 has a long dimension D1=127 mm and a short dimension D2=95 mm, the perimeter P of the flange equals about 352 mm. An air sleeve having a circular top end inflated diameter of 112 mm has an equal circumference or perimeter. Thus, the top end of an air sleeve of that diameter fits snugly over the elliptic flange 80 without being stretched beyond its limit.

If the end retainer 78 has a circular clamping flange in accordance with prior teaching instead of the elliptic flange 80, the diameter of the circular flange of the top end of the air spring sleeve must be about 127 mm in order to maintain the same eccentricity or offset between the geometric center of the flange and the axis 28 of the strut. At that eccentricity, the inclination of the resultant force line 102 is the same as achieved by the end retainer 78 with elliptic flange 80 but at the additional expense of an air spring sleeve having an inflated top end diameter of on the order of 15 mm larger. Stated somewhat differently, for an air spring sleeve having a given inflated top end diameter, the resultant force line 102 of the air spring is inclined more toward the theoretical point 104 with the end retainer 78 according to this invention than with a similar end retainer having a circular end flange of the same diameter as the inflated diameter of the top end of the air spring sleeve.

The embodiment of the invention in which an exclusive property or privilege is claimed are defined as follows:

1. In an automotive strut suspension system including
   a strut having a damper tube connected to an unsprung mass and constrained for generally vertical movement relative to a sprung mass and a rod slidable relative to said damper tube along a longitudinal axis of said strut and a piston on said rod slidable along said longitudinal axis within said damper tube,
   a cord reinforced cylindrical flexible air spring sleeve having a circular first end and a circular second end, and
   an air spring piston on said damper tube sealingly connected to said air spring sleeve at said first end such that a rolling lobe of said air spring is defined around said air spring piston and the geometric center of said rolling lobe defines a first point through which the resultant force of said air spring on said damper tube is directed,
   an air spring top end retainer comprising:
   means defining an elliptic clamping flange having a perimeter length substantially equal to the circumference of said circular second end of said air spring sleeve so that said circular second end fits closely over said elliptic flange without stretching, means defining a center web connected to an edge of said elliptic clamping flange and including a bushing aperture tangent to said elliptic flange at a major dimension end thereof, means connecting said center web to said sprung mass with said rod of said strut projecting into said bushing aperture, resilient bushing means between said rod of said strut and said center web, and means operative to sealingly clamp said circular second end of said air spring sleeve to said elliptic flange so that the geometric center of said elliptic flange defines a second point through which the resultant force of said air spring is directed.

2. The air spring top end retainer recited in claim 1 wherein said means connecting said center web to said sprung mass includes a bearing means between said center web and said sprung mass whereby said top end retainer and said air spring and said strut are rotatable relative to said sprung mass.

* * * * *